June 21, 1960 A. MACOVSKI 2,942,062

NOISE CLIPPING CIRCUITRY FOR TELEVISON RECEIVERS

Filed June 1, 1955 2 Sheets-Sheet 1

INVENTOR.
ALBERT MACOVSKI
BY
[signature]
ATTORNEY

June 21, 1960 A. MACOVSKI 2,942,062

NOISE CLIPPING CIRCUITRY FOR TELEVISON RECEIVERS

Filed June 1, 1955 2 Sheets-Sheet 2

INVENTOR.
ALBERT MACOVSKI
BY [signature]
ATTORNEY

United States Patent Office 2,942,062
Patented June 21, 1960

2,942,062

NOISE CLIPPING CIRCUITRY FOR TELEVISION RECEIVERS

Albert Macovski, Massapequa, N.Y., assignor to Radio Corporation of America, a corporation of Delaware Filed June 1, 1955, Ser. No. 512,476

5 Claims. (Cl. 178—7.3)

The invention relates to synchronizing pulse separating and automatic gain control voltage generating circuitry for television receivers, and it particularly pertains to such circuitry incorporating means to clip any noise that may appear beyond the tips of the synchronizing pulses of the received composite television signal. In present television receiver design practice noise pulse voltages existing in the extra-black region are nullified at the image reproducing device or kinescope by designing the input circuit to the kinescope with the cut-off voltage level at the black level of the video signal wave. The composite video wave, however, is also applied to the automatic gain control (A.G.C.) voltage generating tube and to the synchronizing pulse separating circuitry where such noise pulse voltages can cause poor synchronization, resulting in vertical rolling or horizontal "tearing" of the reproduced image. Although this noise is usually in the form of short duration voltage peaks, it is sufficient to charge the integrating capacitor in the vertical synchronizing pulse integrating circuit, causing it to reach the triggering level of the vertical deflection oscillator earlier than it should. In the horizontal synchronizing circuit these noise pulses can be mistaken for horizontal synchronizing pulses themselves. To reduce the effect of this noise on the synchronizing circuitry, short time-constant circuits are included in the synchronizing circuitry and the video frequency (V.F.) amplifying circuitry is designed so that the tips of the synchronizing pulses are at the cut-off level of the video amplifying tube to clip the noise pulse voltages that extend beyond the tips of the synchronizing pulses. This effectively dictates the use of a sharp cut-off type V.F. amplifier tube and also limits the gain that can be obtained with any tube chosen for this service considerably below the gain which the tube is capable of delivering when it is operated in the most favorable portion of its characteristic.

An object of the invention is to provide noise immunity for the synchronizing circuitry of a television receiver and at the same time obtain greater gain from the video frequency amplifier tube than has been possible with the prior art arrangements.

Another object of the invention is to provide a circuit arrangement for clipping noise voltages that extend above the tips of the synchronizing pulses of a video frequency signal at the input tube the synchronizing pulse separating circuitry and the automatic gain control voltage circuitry without requiring the additional parts and components.

According to the invention the composite video frequency wave is applied to the grid of an A.G.C. voltage generating electron discharge tube which is arranged with the cathode at the same direct potential as the tips of the synchronizing pulses of the video frequency wave so that noise pulse voltages extending beyond the tips are clipped by the diode action of the grid-to-cathode circuit of the A.G.C. tube and the input circuit of the synchronizing pulse separator is connected to the grid of the A.G.C. tube so that the noise clipped wave is also applied to synchronizing circuitry. The A.G.C. action holds the tips of the synchronizing pulses close to the zero bias level of the A.G.C. tube to assure good noise clipping at all times.

In order that the practical aspects of the invention may be more fully appreciated and the invention readily put to use, an express embodiment thereof, given by way of example only, will be described with reference to the accompanying drawing in which.

Figure 1:
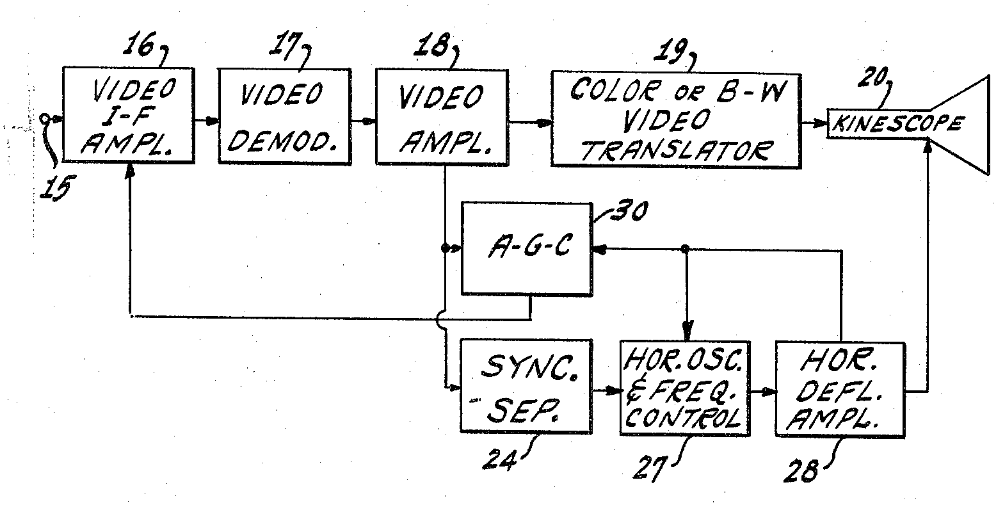
Fig. 1 is a functional diagram of portions of a television receiver to which the circuitry according to the invention may be applied.

A functional diagram of a television receiver to which noise clipping circuitry according to the invention is readily applicable is shown in Fig. 1. Such a television receiver will otherwise comprise circuits which may be entirely conventional and which will be described to illustrate the setting of the invention. In such a receiver television signals appearing at an antenna are applied to a radio frequency wave amplifying circuit and the output therefrom is applied along with the wave obtained from a local beat oscillation generating circuit to a frequency changing circuit. The output of the frequency changing circuit is applied at input terminals 15 to a picture intermediate frequency (I.F.) amplifying circuit 16. The I.F. amplifying circuit 16 may be an individual picture I.F. amplifying circuit or one amplifying both picture and sound signals. The demodulating circuit 17 is coupled to the I.F. amplifying circuit 16 for deriving a video wave from the television signals. Detected video signals are amplified in a radio frequency (R.F.) amplifying circuit 18 and thereafter applied by way of the signal translating circuit 19 to the input circuit of an image reproducing device, or kinescope 20. The translating circuit 19 may consist of brightness and color difference signal translating channels of a color television receiver or simple connections between the video amplifying circuit 18 and the kinescope 20 in the case of a black and white television receiver. Sound signals are derived from frequency changing circuit, or from the I.F. amplifying circuit 16, or from the demodulating circuit 17, or from the video amplifying circuit 18 in accordance with one aspect of the invention for further processing in a sound signal channel comprising an aural signal discriminating circuit, an audio frequency amplifying circuit, and a transducer, the latter usually being in the form of a loud speaker. The output of the video amplifying circuit 18 is also applied to circuitry 24 of which the synchronizing pulses are separated from the picture information and the horizontal synchronizing pulses are separated from the vertical deflection wave generating circuit and horizontal synchronizing pulses are applied to a horizontal oscillator and frequency control circuit 27. The vertical deflection wave is amplified in a vertical wave amplifying circuit and the horizontal deflection wave is amplified in a horizontal deflection wave amplifying circuit 28 to which a high voltage generating circuit is connected, and in the case of a color television receiver focus voltage and convergence generating circuits are also connected, and the output terminals of these circuits are connected to the kinescope 20 to apply vertical and horizontal deflection waves and focus and ultor potentials. A low voltage power supply, usually connected to the local A.C. power lines, is arranged to furnish direct energizing potentials to all circuits. A gated or keyed A.G.C. voltage generating and distributing network 30 is coupled to the video frequency amplifying circuit 18 and to the horizontal deflection amplifying circuit 28 to derive A.G.C. voltage and to apply the same to the picture I.F. amplifying circuit 16 and other of the circuits previously mentioned as desired. Usually the radio frequency (R.F.) amplifying circuits are also supplied.

With the prior art arrangements of this type either separate and relatively complex noise immunizing circuitry is employed in addition to the circuit just described or the video amplifying circuit 18 is arranged to clip the noise pulses extending beyond the tips of the synchronizing pulses. Usually this is done by holding the video signal close to the cut-off level of the first video frequency amplifying tube which clips most of the noise pulses but also operates the V.F. amplifying tube in the low $g_m$ region of the characteristic curve at which the gain is low and at which region the characteristic is far from linear. For the latter reason sharp cut-off pentode tube is usually used whereas a remote cut-off pentode tube would provide better results. It is also desirable that the V.F. tube be operated over a substantially linear portion of the characteristic curve so that the 4.5 megacycle frequency modulated sound wave may be amplified before application to the sound channel.

According to the invention the control grid-cathode circuit of an A.G.C. tube is utilized to clip the noise pulses extending beyond the tips of the synchronizing pulses and the input circuit of the synchronizing separator is connected to the A.G.C. tube grid so that the clipped composite video wave is applied to the synchronizing pulse separating circuit. The A.G.C. voltage applied to the picture I.F amplifying circuit 16 operates automatically to hold the tips of the synchronizing pulses close to zero bias level on the A.G.C. tube for all signal conditions.

Figure 2:
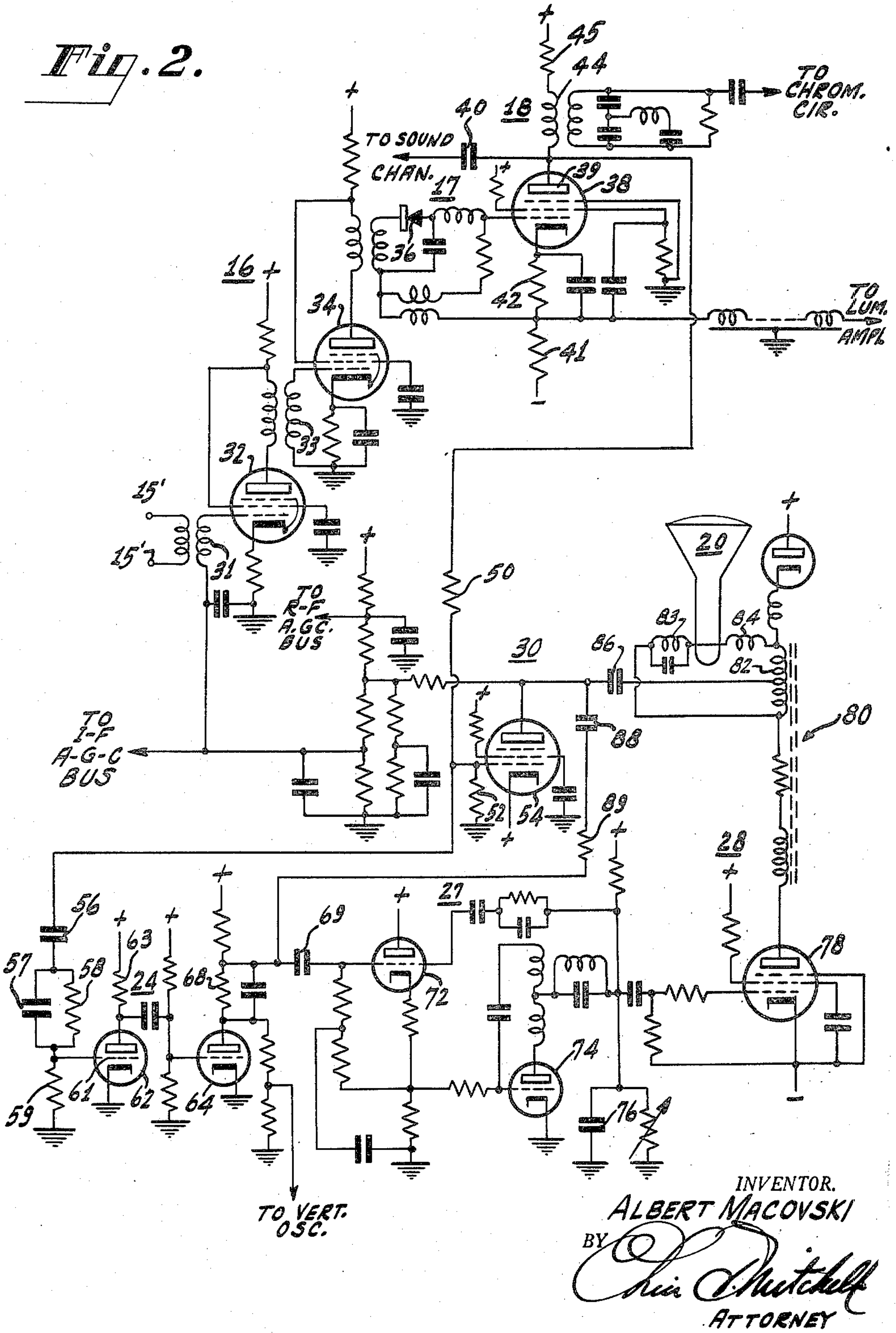
Fig. 2 is a schematic diagram of an example of circuitry performing the functions outlined in Fig. 1 and incorporating circuitry according to the invention.

An example of circuitry for performing the functions outlined by the diagram of Fig. 1 is shown in the schematic diagram of Fig. 2. The composite video modulated I.F. wave is applied to the input terminals 15′ connected to the primary of an I.F. transformer having a secondary winding 31 connected to the grid of a pentode amplifier tube 32. The output of the amplifier tube 32 is induced in the secondary winding 33 of another I.F. transformer connected to the control grid of a final I.F. pentode amplifier tube 34, which tube in connection with the pentode amplifier tube 34 forms the last stages of the I.F. amplifying circuit 16, or alternatively the entire I.F. amplifying circuit. The composite video modulated I.F. wave at the anode of the final I.F. amplifying tube 34 is demodulated in the demodulating circuit 17 comprising a crystal diode rectifier 36, the video frequency wave and the 4.5 mc. frequency sound wave obtained at the anode of the crystal diode rectifier 36 is applied to the control grid of a pentode video frequency amplifying tube 38 of the V.F. amplifying circuit 18. The 4.5 mc. frequency modulated sound wave is derived from the anode 39 and applied by way of a coupling capacitor 40. The bias provided by resistor 42 and the detector voltage is set so that the 4.5 mc. frequency modulated wave is amplified in the linear portion of the characteristic curve of the V.F. amplifier tube 38. As shown the V.F. amplifying circuit 18 is designed for applification to brightness and color difference circuitry of a color television receiver translator circuit 19 but will serve equally as well as the V.F. amplifier of a black-and-white television receiver. Brightness components are taken from the junction of the cathode resistors 41, 42 for application to the luminance amplifier of the translator circuitry 19. By means of a transformer having a primary winding 44 connected in series with a load resistance element 45 chrominance components are obtained and applied to the color difference circuitry of the translator circuit 19. By means of a series resistance element 50 connected to the anode 39 of the V.F. amplifying tube 38 the composite video wave is applied across an input resistor 52 of an A.G.C. generating tube 54 and to a double time constant circuit comprising a series capacitor 56, parallel connected capacitor 57 and resistor 58 and a shunt resistor 59 to the grid 61 of a synchronizing pulse amplifier tube 62. The capacitor 57 and the resistor 58 of the double time constant network parallel section are given values at which the noise pulse amplitude is reduced and the coupling capacitor 56 and shunt resistor 59 are arranged to provide grid leak bias for the amplifier tube 62 to clip the synchronizing pulses, both vertical and horizontal, from the composite video wave. A second pulse amplifying and separating tube 64 is coupled to the first synchronizing pulse amplifying and separating tube 62. Vertical synchronizing pulses are developed across a voltage divider connected across the second synchronizing pulse amplifying and separating tube 63 for application to a vertical deflection wave generating circuit (not shown). Horizontal synchronizing pulses are developed across a load resistor 68 and applied by way of coupling capacitor 69 to the grid of a control tube 72 in the frequency control circuitry. The grid of a blocking oscillator tube 74 is coupled to the control tube 72 for developing a sawtooth voltage wave which is applied to the grid of a horizontal deflection wave amplifying tube 78 in the horizontal deflection wave amplifying circuit 28. Sawtooth deflection waves of horizontal scanning frequency are induced in the secondary winding 82 of the horizontal output transformer 80 and applied to the horizontal deflection system winding of two sections 83, 84. A flyback gating voltage pulse of the order of 600 volts with respect to ground appearing across the output winding 82 is applied by means of a charging capacitor 86 to the anode of the A.G.C. tube 54. This voltage pulse is also attenuated and differentiated in a series circuit comprising a capacitor 88 and a resistor 89 and added to the comparison wave at the grid of the oscillator control tube 72 by way of the coupling capacitor 69 to effect a delay between the signal and the horizontal synchronizing pulse by re-shaping the waveform to present more time for action of the control tube 72.

Figure 3:
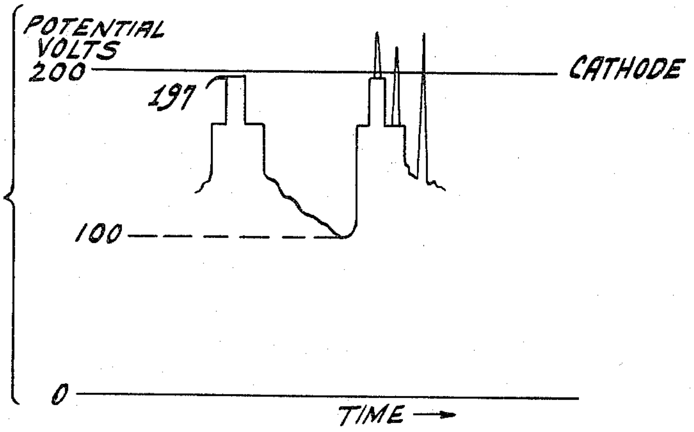
Fig. 3 is a graphical representation of waveforms useful in explanation of the operation of circuitry according to the invention.

The flyback pulse applied to the anode of the A.G.C. tube 54 raising the anode to a potential of the order of 400 volts causing the A.G.C. tube to conduct since the cathode is connected to a point of positive potential equal to the direct potential of the composite video wave at the anode of the V.-F. amplifier tube which is of the order of 200 volts. The degree of conduction of the A.G.C. tube 54 is dependent upon the amplitude of the composite video wave applied to the grid during the gating interval which charges the capacitor 86 in proportion with the strength of the signal. Capacitor 86 is discharged during the idle period of the A.G.C. tube cycle through the A.G.C. filter network to apply an A.G.C. voltage of the order of 2–13 volts negative between the A.G.C. bus and ground depending upon the strength of the received signal. The A.G.C. voltage is applied through the secondary winding 31 to the grid of the associated I.-F. amplifying tube 32 to vary the gain of this tube so that the tips of the synchronizing pulses are relatively close, within 2–4 volts, to zero bias on the A.G.C. tube 54. When the voltage of the composite video wave exceeds 200 volts at the grid of the tube 54 conduction will be effected between the grid and cathode to clip those portions of any noise pulses exceeding the 200 volt cathode level as illustrated in Fig. 3, without affecting the operation of the A.G.C. tube 54 during the flyback pulse or gating interval since the anode of the A.G.C. tube 54 is then at a greater positive voltage than the control grid. Thus the grid-cathode circuit of the A.G.C. tube 54 serves as a diode clipping tube without calling for any additional parts or components. At the same time the noise pulses are clipped from the wave applied to the grid 61 of the synchronizing amplifying and separating tube 62.

Not only does the circuit arrangement according to the invention provide noise immunity without requiring additional parts or components or complex noise inverting and cancelling circuitry, but also the V.-F. amplifying tube 38 may be operated in a higher $g_m$ region providing additional gain for both sound and video signals.

Tests of an embodiment of the invention constructed along the lines shown in a schematic diagram of Fig. 2 and using the component values listed below provided an increase of gain of the V.-F. amplifying tube of more than 2 to 1 over the circuit arrangement as wired prior to the application of the circuit according to the invention as well as positive immunity against noise in of the tips of the synchronizing pulses.

| Ref. No. | Component | Type or Value |
|---|---|---|
| 32 | I.-F. amplifier tube | ½ 6AZ8. |
| 34 | I.-F. amplifier tube | ½ 6AN8. |
| 36 | Crystal diode rectifier | 1N60. |
| 38 | V.-F. amplifier tube | 6CL6. |
| 40 | Coupling capacitor | 6.8 mmf. |
| 45 | Load resistor | 5 ko. |
| 50 | Isolating resistor | 68 ko. |
| 52 | Grid resistor | 150 ko. |
| 54 | A.G.C. tube | 6AU6. |
| 56 | Coupling capacitor | 0.01 mf. |
| 57 | Series capacitor | 330 mmf. |
| 58 | Series resistor | 470 ko. |
| 59 | Grid resistor | 2.7 mego. |
| 62 | Pulse amplifying tube | ½ 6AN8. |
| 63 | Load resistor | 2.2 mego. |
| 64 | Pulse amplifying tube | ½ 6AZ8. |
| 86 | Charging capacitor | 470 mmf. |
| 88 | Differentiating capacitor | 56 mmf. |
| 89 | Differentiating resistor | 8,200 o. |

The power supply used with the circuit arrangement developed 400 volts to the load resistor of the V.-F. amplifier tube 38 and minus 20 volts to the points marked with the minus (−) symbol. The cathode of the A.G.C. tube 54 was maintained at 200 volts and the other points marked with the plus (+) sign were given the usual voltages between 150 and 300 volts. Other component parts values will be determined by those skilled in the art for other applications of the circuitry according to the invention.

The invention claimed is:

1. A television receiving circuit arrangement, including a video frequency amplifying tube having an input circuit and an output circuit, means to apply a composite video signal to said input circuit, means to derive from said output circuit an amplified composite signal with the tips of the synchronizing pulses positive most, an automatic gain control voltage generating tube having at least a cathode, a grid and an anode, a resistance element interconnecting the grid of said generating tube and the output circuit of said amplifying tube, means for maintaining the cathode of said generating tube at a predetermined value of fixed direct potential, means to apply a gating pulse to the anode of said generating tube to render the same conducting in proportion to the amplitude of said amplified composite signal and to produce a gain controlling voltage, means connected between the anode of said generating tube and the input circuit of said amplifying tube to vary the signal level at the output circuit of said amplifying tube in accordance with the amplitude of signal to maintain the grid-cathode voltage of said generating tube at substantially zero level in the presence of said synchronizing pulses, whereby any amplitude excursions of said amplified composite signal beyond the tips of the synchronizing pulses on the grid of said generating tube are clipped by diode action of the cathode-grid circuit of said generating tube, a pulse separating tube having an input circuit, and signal coupling means connected between the input circuit of said separating tube and the grid of said generating tube.

2. A television receiving circuit arrangement, including an intermediate frequency amplifying tube, a demodulating device connected to said amplifying tube to derive a composite video signal, a video frequency amplifying tube having an input circuit coupled to said demodulating device and an output circuit from which an amplified composite signal with the tips of the synchronizing pulses positive most is derived, an automatic gain control voltage generating tube having at least a cathode, a grid and an anode, a resistance element interconnecting the grid of said generating tube to the output of said video frequency amplifying tube, means maintaining the cathode of said generating tube at a predetermined value of fixed direct potential, means to apply a gating pulse to the anode of said generating tube to render the same conducting in proportion to the amplitude of said amplified composite signal and to produce a gain controlling voltage, means for applying said gain controlling voltage to said intermediate frequency amplifying tube to vary the gain thereof in accordance with the amplitude of signal whereby any amplitude excursions of said amplified composite signal beyond the tips of the synchronizing pulses on the grid of said generating tube are clipped by diode action of the cathode-grid circuit of said generating tube, a pulse separating tube having an input circuit, and signal coupling means connected between the input circuit of said separating tube and the grid of said generating tube.

3. A television receiving circuit arrangement, including a signal amplifying tube having an input circuit to which a signal having pulse components is applied and an output circuit from which there is derived an amplified signal with the tips of the pulse components positive most, an automatic gain control voltage generating tube having at least a cathode, a grid and an anode, means for connecting the grid of said generating tube to the output of said amplifying tube, means for maintaining the cathode of said generating tube at a predetermined value of fixed direct potential, means to apply a gating pulse to the anode of said generating tube to render the same conducting in proportion to the amplitude of said amplified signal and to produce a gain controlling voltage, means for maintaining the grid potential of said generating tube substantially at zero bias level during the application of the pulse components of said signal whereby any amplitude excursions of said signal beyond the tips of the pulse components on the grid of said generating tube are clipped by diode action of the cathode-grid circuit of said generating tube, a synchronizing pulse separating tube having at least a cathode, an anode, and a grid, signal coupling means connecting said last named grid to the grid of said generating tube, whereby the clipping action of said generating tube also serves said separating tube, signal coupling means connecting the cathode of said signal coupling generating tube and the cathode of said synchronizing pulse separating tube to a point of reference potential.

4. A television receiving circuit arrangement, including a video frequency amplifying tube having an input circuit to which a composite video signal is applied and an output circuit from which an amplified composite signal is derived with the tips of the synchronizing pulses positive most, an automatic gain control voltage generating tube having at least a cathode, a grid and an anode, a resistance element interconnecting the grid of said generating tube and the output of said amplifying tube, means for maintaining the cathode of said generating tube at a predetermined value of fixed direct potential, means to apply a gating pulse to the anode of said generating tube to render the same conducting in proportion to the amplitude of said amplified composite signal and to produce a gain controlling voltage, means coupled between the anode of said generating tube and the input of said amplifying tube to vary the signal level in accordance with the amplitude of signal whereby any amplitude excursions of said amplified composite signal beyond the tips of the synchronizing pulses on the grid of said generating tube are clipped by diode action of the cathode-grid circuit of said generating tube and a synchronizing pulse separating tube having at least a cathode connected to a point of fixed reference potential, an anode, and a grid connected to the grid of said generating tube, the clipping action of said generating tube serving to limit said amplitude excursions at the grid-cathode circuit of said separating tube.

5. A television receiving circuit including a video frequency amplifying tube having an input circuit to which a composite video signal having synchronizing pulses is applied and an output circuit from which an amplified composite video signal with the tips of the synchronizing pulses positive most is derived, comprising an electron discharge tube having a grid, a cathode, and an anode, means coupling said grid to the output circuit of said amplifying tube, means for maintaining said cathode at a fixed positive potential of a value such that any pulse components on the grid of said tube substantially exceeding the potential on said cathode are attenuated by conduction between said cathode and said grid, means for normally maintaining said anode at a potential lower than that on said cathode and for periodically raising said anode to a potential higher than that on said cathode, a second electron discharge tube having a cathode, an anode and a grid, means for maintaining the cathode of said second discharge tube at an alternating potential equal to that on the cathode of the first said electron discharge tube, and means coupling the grid of said first electron discharge tube to the grid of said second discharge tube, whereby said pulse components are also removed from the grid-cathode circuit of said second electron discharge tube.

References Cited in the file of this patent

UNITED STATES PATENTS

| | | |
|---|---|---|
| 2,673,892 | Richman | Mar. 30, 1954 |
| 2,797,258 | Denton | June 25, 1957 |

OTHER REFERENCES

Rider Television Manual, vol. 10, Magnavox TV, pages 10–19, copyrighted November 21, 1952 (Model C & E 105 series).

UNITED STATES PATENT OFFICE

CERTIFICATE OF CORRECTION

Patent No. 2,942,062 June 21, 1960

Albert Macovski

It is hereby certified that error appears in the printed specification of the above numbered patent requiring correction and that the said Letters Patent should read as corrected below.

Column 3, line 68, for "applification" read -- application --.

Signed and sealed this 6th day of December 1960.

(SEAL)

Attest:

KARL H. AXLINE

Attesting Officer

ROBERT C. WATSON

Commissioner of Patents